United States Patent
Shinoki et al.

(10) Patent No.: US 10,493,725 B2
(45) Date of Patent: Dec. 3, 2019

(54) THERMAL INSULATOR, VACUUM INSULATION MEMBER, AND METHOD OF MANUFACTURING VACUUM INSULATION MEMBER

(71) Applicant: Mitsubishi Electric Corporation, Chiyoda-ku (JP)

(72) Inventors: Toshio Shinoki, Chiyoda-ku (JP); Yoshikazu Yaji, Chiyoda-ku (JP); Shunkei Suzuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 4 days.

(21) Appl. No.: 16/069,213

(22) PCT Filed: Oct. 12, 2016

(86) PCT No.: PCT/JP2016/080185
§ 371 (c)(1),
(2) Date: Jul. 11, 2018

(87) PCT Pub. No.: WO2017/134862
PCT Pub. Date: Aug. 10, 2017

(65) Prior Publication Data
US 2019/0001626 A1    Jan. 3, 2019

(30) Foreign Application Priority Data
Feb. 4, 2016    (JP) ................. 2016-020070

(51) Int. Cl.
*B32B 15/08* (2006.01)
*B32B 15/085* (2006.01)
(Continued)

(52) U.S. Cl.
CPC .............. *B32B 15/085* (2013.01); *B32B 3/04* (2013.01); *B32B 5/022* (2013.01); *B32B 5/26* (2013.01);
(Continued)

(58) Field of Classification Search
CPC .... Y10T 428/231; E04B 1/803; F16L 59/065; Y02B 80/12; F25D 2201/14
See application file for complete search history.

(56) References Cited

U.S. PATENT DOCUMENTS 5,376,424 A    12/1994    Watanabe

FOREIGN PATENT DOCUMENTS

| DE | 10 2004 050 549 A1 | 3/2006 |
| JP | 60-86369 A | 5/1985 |

(Continued)

OTHER PUBLICATIONS

International Search Report dated Dec. 13, 2016 in PCT/JP2016/080185 filed Oct. 12, 2016.
(Continued)

*Primary Examiner* — Alexander S Thomas
(74) *Attorney, Agent, or Firm* — Oblon, McClelland, Maier & Neustadt, L.L.P.

(57) ABSTRACT

A thermal insulator, a vacuum insulation member, and a method of manufacturing a vacuum insulation member maintaining reliability and having an excellent thermal insulation property. The thermal insulator thermally insulates a thermal insulation target disposed on one surface side of a vacuum insulation member including a core and an outer covering member enclosing the core, from an outer region located on an other surface side of the vacuum insulation member. The vacuum insulation member includes a radiation prevention film configured to prevent or reduce radiation. The radiation prevention film is disposed between
(Continued)

the core and the outer covering member and in a peripheral region on the other surface side.

11 Claims, 5 Drawing Sheets

(51) Int. Cl.
| | |
|---|---|
| *F16L 59/065* | (2006.01) |
| *B32B 7/02* | (2019.01) |
| *B32B 15/14* | (2006.01) |
| *B32B 15/20* | (2006.01) |
| *B32B 27/32* | (2006.01) |
| *B32B 27/36* | (2006.01) |
| *B32B 3/04* | (2006.01) |
| *B32B 5/02* | (2006.01) |
| *B32B 5/26* | (2006.01) |

(52) U.S. Cl.
CPC ............... *B32B 7/02* (2013.01); *B32B 15/08* (2013.01); *B32B 15/14* (2013.01); *B32B 15/20* (2013.01); *B32B 27/32* (2013.01); *B32B 27/36* (2013.01); *F16L 59/065* (2013.01); *B32B 2262/101* (2013.01); *B32B 2307/304* (2013.01); *B32B 2509/10* (2013.01); *F25D 2201/124* (2013.01); *F25D 2201/1282* (2013.01); *F25D 2201/14* (2013.01); *Y10T 428/231* (2015.01)

(56) References Cited

FOREIGN PATENT DOCUMENTS

| | | |
|---|---|---|
| JP | 60-174639 A | 9/1985 |
| JP | 5-215291 A | 8/1993 |
| JP | 8-142264 A | 6/1996 |
| JP | 2002-90049 A | 3/2002 |
| JP | 2005-163989 A | 6/2005 |
| JP | 2007-139118 A | 6/2007 |
| JP | 2011-190925 A | 9/2011 |
| WO | WO 2011/102337 A1 | 8/2011 |
| WO | WO 2012/044001 A2 | 4/2012 |

OTHER PUBLICATIONS

Notification of Reasons for Refusal dated Apr. 6, 2017 in corresponding Japanese Patent Application No. 2017-506423, 9 pages (with English translation).
Decision of Refusal dated Jul. 27, 2017 in corresponding Japanese Patent Application No. 2017-506423, 7 pages (with English translation).
Extended European Search Report dated Jan. 3, 2019 in Patent Application No. 16889345.1, 8 pages.
Combined Chinese Office Action and Search Report dated May 5, 2019 in Patent Application No. 201680079712.4 (with partial English translation and English translation of categories of cited documents), 13 pages.

THERMAL INSULATOR, VACUUM INSULATION MEMBER, AND METHOD OF MANUFACTURING VACUUM INSULATION MEMBER

TECHNICAL FIELD

The present invention relates to a thermal insulator including a vacuum insulation member, the vacuum insulation member, and a method of manufacturing the vacuum insulation member.

BACKGROUND ART

A vacuum insulation member achieves a higher thermal insulation performance than any other thermal insulation member such as glass wool, and thus is applied to various cooling/cooling energy instruments. Measures for achieving a high thermal insulation performance have been taken through, for example, reduction of solid heat transfer through a core of the vacuum insulation member and prevention of gas heat transfer by maintaining the degree of vacuum. Technologies of preventing or reducing radiation heat transfer have been disclosed for higher thermal insulation performance.

For example, Patent Literature 1 discloses a vacuum insulation member in which a core made of an open cell foamed body is sandwiched between two aluminum foil shielding plates with metallic gloss, and inserted in a plastic laminate film bag in the sandwiched state. Patent Literature 2 discloses a vacuum insulation member including a thermal insulation bag, an inner surface of which is covered by a thin metal film.

CITATION LIST

Patent Literature

Patent Literature 1: Japanese Patent Laid-Open No. 60-174639
Patent Literature 2: Japanese Patent Laid-Open No. 2002-90049

SUMMARY OF INVENTION

Technical Problem

In both the vacuum insulation members disclosed in Patent Literatures 1 and 2, the shielding plates or the thin metal films are provided on both surfaces of the vacuum insulation member. Such a configuration of the vacuum insulation member included in a thermal insulator has given rise to problems such as cost increase and complication of assembly work. When the vacuum insulation member is bent in a shape for covering the thermal insulator, the shielding plate is curved due to, for example, a wrinkle appearing on the inner side of the bending. When the shielding plate is curved, part of the shielding plate is inclined in the direction of heat transfer so that heat is transferred through the shielding plate, which results in degradation of the thermal insulation performance of the vacuum insulation member. Accordingly, the thermal insulation property of the thermal insulator degrades, and the thermal insulator cannot maintain reliability.

An object of the present invention is to provide a thermal insulator that maintains reliability and has an excellent thermal insulation property using a vacuum insulation member in which a shielding plate is efficiently disposed, and to provide the vacuum insulation member, and also provide a method of manufacturing the vacuum insulation member.

Solution to Problem

A thermal insulator according to an embodiment of the present invention thermally insulates a thermal insulation target disposed on one surface side of a vacuum insulation member including a core and an outer covering member enclosing the core, from outside positioned on an other surface side of the vacuum insulation member. The vacuum insulation member includes a radiation prevention film configured to prevent or reduce radiation. The radiation prevention film is disposed between the core and the outer covering member and in a peripheral region on the other surface side of the above surface sides.

A vacuum insulation member according to an embodiment of the present invention thermally insulates a thermal insulation target disposed on the one surface side from an outer region on the other surface side. The vacuum insulation member includes a core, an outer covering member enclosing the core, and a radiation prevention film configured to prevent or reduce radiation. The radiation prevention film is disposed between the core and the outer covering member in a peripheral region on the other surface side.

A method of manufacturing a vacuum insulation member according to an embodiment of the present invention manufactures a vacuum insulation member configured to thermally insulate a thermal insulation target disposed on one surface side from an outer region located on the other surface side. The manufacturing method includes: a preparation process of preparing a core, an outer covering member enclosing the core, and a radiation prevention film configured to prevent or reduce radiation; a disposition process of inserting the core and the radiation prevention film into the outer covering member and disposing the radiation prevention film between the core and the outer covering member in a peripheral region on the other surface side; and a vacuum sealing process of performing vacuum sealing of the outer covering member in which the core is inserted and the radiation prevention film is disposed in the peripheral region.

Advantageous Effects of Invention

In a thermal insulator, a vacuum insulation member, and a method of manufacturing a vacuum insulation member according to embodiments of the present invention, a vacuum insulation member can be provided in which a radiation prevention film is provided on one side of a core. The vacuum insulation member thus provided can be disposed so that an outer covering member, the radiation prevention film, the core, and a thermal insulation target are arranged in this order from an outer-region side of two sides which are the external side and a thermal insulation target side. This configuration can prevent or reduce heat conduction between inside and outside of the thermal insulator, thereby improving a thermal insulation property of the thermal insulator.

DESCRIPTION OF EMBODIMENTS

Embodiment 1

Configuration of Thermal Insulator 11

Figure 1:
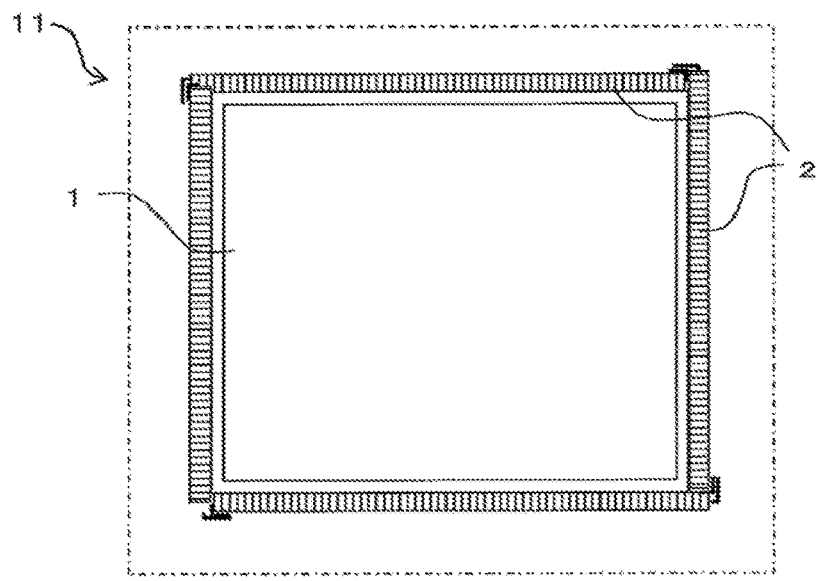
FIG. 1 is a pattern diagram illustrating the configuration of a thermal insulator according to Embodiment 1 of the present invention.

The following describes a thermal insulator 11 according to Embodiment 1 of the present invention. FIG. 1 is a pattern diagram illustrating the configuration of the thermal insulator 11 according to the present embodiment. As illustrated in FIG. 1, the thermal insulator 11 includes, for example, a thermal insulation target 1 having a rectangular parallelepiped shape, and six vacuum insulation members 2 covering the periphery of the thermal insulation target 1. The thermal insulator 11 is used to prevent heat transfer from the thermal insulation target 1. The shape of the thermal insulation target 1 is not limited to a rectangular parallelepiped shape, but the technology of the thermal insulator 11 may be applied to, for example, a hot-water tank in which hot water is accumulated, a compressor, and a refrigerator, each of which is applied as the thermal insulation target 1. The number of the vacuum insulation members 2 may be one or more.

Figure 2:
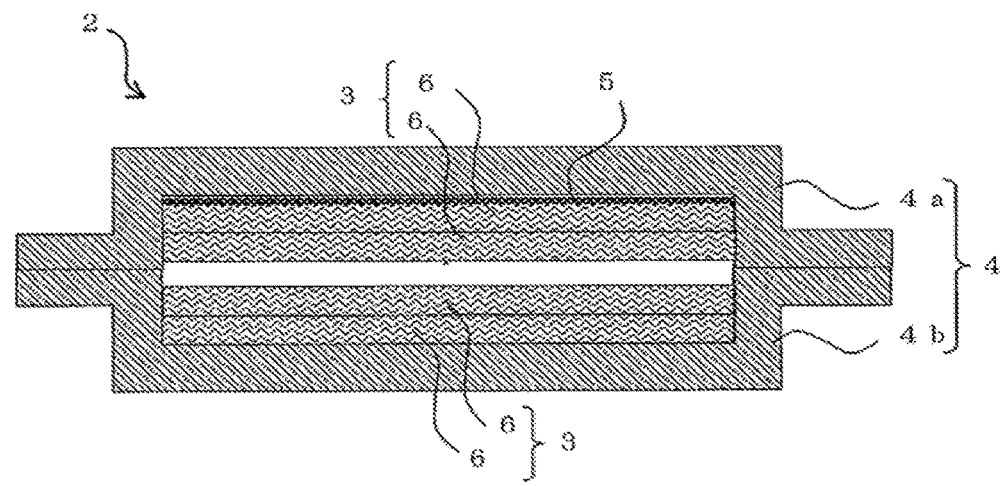
FIG. 2 is a pattern diagram of a vacuum insulation member of the thermal insulator according to Embodiment 1.

FIG. 2 is a pattern diagram illustrating the configuration of each vacuum insulation member 2 of the thermal insulator 11 according to the present embodiment. As illustrated in FIG. 2, each vacuum insulation member 2 includes an outer covering member 4, a core 3 provided in the outer covering member 4, and a radiation prevention film 5 disposed between one of surfaces of the core 3 and the outer covering member 4, and has a rectangular shape when viewed from above. The core 3 and the radiation prevention film 5 are disposed between two outer covering member sheets 4a and 4b of the outer covering member 4. The outer covering member sheet 4b, the core 3, the radiation prevention film 5, and the outer covering member sheet 4a are disposed in this order from the thermal insulation target 1 side.

The core 3 is formed in a rectangular shape when viewed from above by stacking one or a plurality of fiber sheets 6 having a stack structure in which fibers such as glass fibers are stacked. For example, each fiber sheet has a thickness of 0.5 mm approximately. Although FIG. 2 illustrates a structure in which four fiber sheets 6 are stacked, the number of fiber sheets 6 is not limited to four. In each fiber sheet 6, the fibers are disposed parallel to a sheet surface as much as possible, and stacked in the thickness direction of the sheet. The sheet surface is a surface orthogonal to the thickness direction of the fiber sheet 6. Accordingly, the core 3 has a structure with which a thermal insulation performance in the thickness direction is improved by the fibers stacked in the thickness direction. The fiber sheet 6, which is made of the glass fibers, includes a space at a volume ratio of 90% approximately, whereas the remaining volume is occupied by the glass fibers, thereby achieving a high thermal insulation performance.

The two outer covering member sheets 4a and 4b form the outer covering member 4. The outer covering member sheets 4a and 4b are made of laminate films each having a multi-layer structure and hold the core 3 therebetween in the stacking direction. The laminate films of the outer covering member sheets 4a and 4b include, for example, aluminum laminate sheets formed by stacking an oriented nylon film, an aluminum evaporation coating polyethylene terephthalate film, an aluminum foil film, and a cast polypropylene film. Also, there is a case where the above-described examples are referred to as an ONy film, an AL evaporation coating PET film, an AL foil film, and a CPP film, respectively. The layers have, for example, film thicknesses of 25 μm, 12 μm, 7 μm, and 30 μm, respectively in the above-described order.

Figure 3:
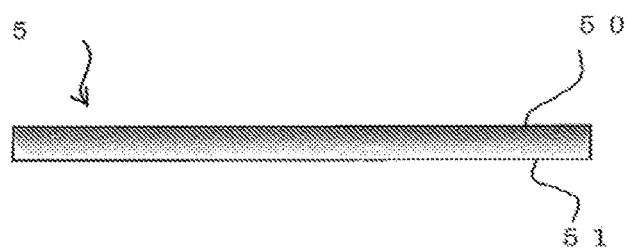
FIG. 3 is a pattern diagram illustrating a section of a radiation prevention film for use in the vacuum insulation member according to Embodiment 1.

FIG. 3 is a pattern diagram illustrating a section of the radiation prevention film 5 included in each vacuum insulation member 2 according to the present embodiment. As illustrated in FIG. 3, the radiation prevention film 5 is an aluminum foil film produced to have, for example, a thickness of 30 μm by rolling aluminum, and prevents or reduces transmission of radiation heat. The radiation prevention film 5 is cut into an area equal to or smaller than the area of the core 3 when viewed from above, and sandwiched between the core 3 and one of inner surfaces of the outer covering member 4. The radiation prevention film 5 is in contact with an inner surface of the outer covering member sheet 4a of the outer covering member 4, and the outer covering member sheet 4a is disposed on a surface of the radiation prevention film 5 opposite to the thermal insulation target 1. Specifically, the radiation prevention film 5 is disposed between the core 3 and the outer covering member 4 and in a peripheral region (in a region between the outer covering member sheet 4a and the fiber sheet 6 in an example as illustrated in FIG. 2) on an outer-region side, not the thermal insulation target 1 side. In other words, the radiation prevention film 5 is disposed in a peripheral region located between the core 3 and the outer covering member 4 and having a temperature close to a temperature of the outer region. The outer covering member sheet 4b of the sheets of the outer covering member 4, which is not in contact with the radiation prevention film 5, is disposed on the thermal insulation target 1 side. A gloss surface 50, and a non-gloss surface 51 having a radiation rate higher than that of the gloss surface 50, are formed on the radiation prevention film 5. The non-gloss surface 51 is a surface of the radiation prevention film 5, which is in contact with the outer covering member sheet 4a, and the gloss surface 50 is a surface of the radiation prevention film 5, which is in contact with the core 3. Thus, radiation heat transfer is particularly prevented or reduced by the surface of the radiation prevention film 5, which has the low radiation rate and is disposed on the core 3 side. An aluminum foil film having the non-gloss surface 51 and the gloss surface 50 is widely used and obtained at a relatively low price. Thus, the aluminum foil film having the non-gloss surface 51 and the gloss surface 50 can be used as the radiation prevention film 5 to reduce the manufacturing cost of the thermal insulator 11.

Each fiber sheet 6 included in the core 3 is formed by, for example, a papermaking method. In the papermaking method, chopped fibers and thin fibers are dispersed in liquid. The chopped fibers are obtained by cutting, into pieces having lengths of 2 to 15 mm, a glass fiber manufactured by a continuous filament manufacturing method and each has a diameter of 4 to 13 µm. The thin fibers are manufactured by a firing method and each has a diameter of 1 µm approximately. Then, the liquid is subjected to papermaking by, for example, an automatic feed papermaking machine and dried to produce a fiber sheet whole cloth having a thickness of 0.5 mm approximately. The fiber sheet whole cloth is cut in a size substantially equal to the area of each required vacuum insulation member 2, thereby producing the fiber sheets 6. In each fiber sheet 6 obtained by the papermaking method, most of the fibers are arrayed in a direction substantially orthogonal to the thickness direction, in other words, a direction parallel to the sheet surface. The fiber sheet 6 is cut into pieces each having, for example, a planar dimension of 500 mm×500 mm, and a plurality of the pieces are stacked to form the core 3 having a stack structure in which the fibers are stacked in the thickness direction.

The stack of the fiber sheets 6 may be formed by rolling, into a coil shape, the fiber sheet whole cloth formed by the papermaking method but yet to be cut. The production of the fiber sheet whole cloth is not limited to the papermaking method, but may be performed by, for example, a dry manufacturing method using a centrifugal method. When the dry manufacturing method is used, it suffices that a core 3 is made of one or several sheets to have a necessary thickness, since a fiber sheet has a lamination structure in which fibers are already stacked. That is, the result structure is not limited to a structure in which a plurality of fiber sheets 6 are stacked.

Method of Manufacturing Thermal Insulator 11

The following is an explanation of a method of manufacturing the thermal insulator 11 in the present embodiment. In manufacturing of the thermal insulator 11, first, the core 3, the outer covering member 4, and the radiation prevention film 5 are prepared to form each vacuum insulation member 2. The core 3 is obtained by stacking and cutting the fiber sheet whole cloth produced by, for example, the papermaking method. In this process, any distortion occurring because of a pressure difference between atmospheric pressure and vacuum in a later process is desirably taken into consideration so that the fiber sheets 6 have desired dimensions and thicknesses. The radiation prevention film 5 is produced by rolling, for example, aluminum. The core 3 and the radiation prevention film 5 are dried. The outer covering member 4 is produced by, first, cutting a laminate sheet into rectangular shapes in dimensions calculated from dimensions at completion to form the two outer covering member sheets 4a and 4b and then joining the outer covering member sheets 4a and 4b at three sides to form a bag. The outer covering member 4 may be produced through a procedure in which an outer covering member sheet in a rolled shape is cut into pieces at a predetermined width, and the pieces are stacked, joined together along two continuous lateral sides and along one side in a depth direction, and cut at the one side.

Subsequently, the core 3 and the radiation prevention film 5 together with absorbent are inserted into the outer covering member 4, and the outer covering member 4 is disposed in a vacuum chamber. In this process, the radiation prevention film 5 is inserted so that the non-gloss surface 51 is in contact with the inner surface of the outer covering member sheet 4a among the two outer covering member sheets 4a and 4b, and the gloss surface 50 is in contact with the core 3. In this case, the absorbent may be inserted as necessary. Subsequently, the inside of the vacuum chamber is depressurized to a predetermined vacuum pressure of, for example, 0.1 to 3 Pa approximately. In this state, an opening portion at the remaining side of the outer covering member 4 is sealed by heat sealing to achieve vacuum sealing of the outer covering member. The pressure in the vacuum chamber is then returned to atmospheric pressure, and the vacuum insulation member 2 is taken out of the vacuum chamber.

Subsequently, a plurality of vacuum insulation members 2 thus manufactured cover the periphery of the thermal insulation target 1 while each vacuum insulation member 2 is disposed so that the outer covering member sheet 4b, the core 3, the radiation prevention film 5, and the outer covering member sheet 4a are arranged in this order from the thermal insulation target 1 side. Then, the plurality of vacuum insulation members 2 are joined together to obtain the thermal insulator 11 including the vacuum insulation members 2, which is illustrated as in FIG. 1.

Performance Evaluation of Vacuum Insulation Member 2

Thermal conductivity was measured and performance evaluation was performed with respect to each of the vacuum insulation member 2 according to the present embodiment, a vacuum insulation member according to Comparative Example 1, and a vacuum insulation member according to Comparative Example 2.

In each of the vacuum insulation member 2 of the present embodiment, the vacuum insulation member of Comparative Example 1, and the vacuum insulation member of Comparative Example 2, the fiber sheets 6 included in the core 3 were produced from chopped glass fibers and micro glass fibers by the papermaking method. The chopped glass fibers had an average fiber diameter of 6 µm and an average fiber length of 12 mm, and the micro glass fibers had an average fiber diameter of 0.8 µm and were manufactured by the firing method. A stack of thirty fiber sheets 6 each formed to have a thickness of 0.5 mm was cut into pieces in a planar dimension of 500 mm×500 mm, and the core 3 was produced from the pieces. The outer covering member sheets 4a and 4b were each aluminum laminate sheet as a stack of an oriented nylon film having a film thickness of 25 µm, an aluminum evaporation coating polyethylene terephthalate film having a film thickness of 12 µm, an aluminum foil film having a film thickness of 7 µm, and a cast polypropylene film having a film thickness of 30 µm. The radiation prevention film 5 was an aluminum foil film having a thickness of 30 µm. At finishing rolling in a rolling process of the aluminum foil film, doubly-placed rolling, which leads to improved productivity, was performed to form the gloss surface 50 as a rolled side and the non-gloss surface 51 as one of placed-over surfaces. The radiation rate of the gloss surface 50 was lower than that of the non-gloss surface 51 by 5% approximately in comparison between the gloss surface 50 and the non-gloss surface 51.

First, to produce the vacuum insulation member of Comparative Example 1, only the core 3 was inserted between the two outer covering member sheets 4a and 4b, and decompression and sealing were performed. Then, thermal conductivity was measured from heat flux in a stationary state with a high temperature side of 70 degrees C. and a low temperature side of 5 degrees C. The thermal conductivity obtained as a result was 0.0023 W/(m·K).

To produce the vacuum insulation member of Comparative Example 2, the radiation prevention films 5 were disposed on both surfaces of the core 3, respectively, the core 3 was inserted between the two outer covering member sheets 4a and 4b, and decompression and sealing were performed. Then, similarly to Comparative Example 1, thermal conductivity was measured with a high temperature side of 70 degrees C., and a low temperature side of 5 degrees C. The thermal conductivity obtained as a result was 0.0021 W/(m·K), which is lower than the thermal conductivity of Comparative Example 1. This is thought to be because radiation heat transfer from the high temperature side to the low temperature side was reduced by the two radiation prevention films 5 provided inside the vacuum insulation member.

Subsequently, the vacuum insulation member 2 of the present embodiment was produced by disposing the outer covering member sheet 4b, the core 3, the radiation prevention film 5, and the outer covering member sheet 4a in this order and performing decompression and sealing. The vacuum insulation member 2 includes the outer covering member sheet 4a, which is in contact with the radiation prevention film 5, at a low temperature side, and the outer covering member sheet 4b at a high temperature side. Then, similarly to Comparative Examples 1 and 2, thermal conductivity was measured with a high temperature side of 70 degrees C. and a low temperature side of 5 degrees C. The thermal conductivity obtained as a result was 0.0021 W/(m·K). This result is equivalent to that the vacuum insulation member of Comparative Example 1, in which the radiation prevention films 5 were provided on both sides of the core 3. Accordingly, it was confirmed that a configuration in which the radiation prevention film 5 is disposed only on the low temperature side as in the vacuum insulation member 2 can obtain an advantage equivalent to that of a configuration in which the radiation prevention films 5 are provided on both sides of the core 3.

Effects

According to the above-described thermal insulator 11 according to the present embodiment, the vacuum insulation member 2 including the core 3, the outer covering member 4 covering the core 3, and the radiation prevention film 5 disposed between one surface of the core 3 and the outer covering member 4 is disposed so that the core 3 and the radiation prevention film 5 are arranged in this order from the thermal insulation target 1 side. With this configuration, since the radiation prevention film 5 is provided only on the one surface of the core 3, heat conduction through the radiation prevention film 5 can be prevented between inside and outside of the thermal insulator 11, and the cost of the vacuum insulation member 2 can be reduced. In addition, since no radiation prevention film 5 is provided on a side closer to the thermal insulation target 1, heat does not conduct through the radiation prevention film 5 even when the vacuum insulation member 2 is bent. Accordingly, low thermal conductivity is maintained, thereby achieving the thermal insulator 11 having an excellent thermal insulation property and maintaining reliability.

In the thermal insulator 11 according to the present embodiment, the radiation prevention film 5 has one surface and an other surface having a radiation rate lower than that of the one surface, and the one surface is disposed on the thermal insulation target 1 side. Since the surfaces of the radiation prevention film 5 have different radiation rates, the cost of the vacuum insulation member 2 can be reduced, and elements can be efficiently arranged to prevent radiation. The one surface is an exemplary second surface of embodiments of the present invention, and the other surface, which has a lower radiation rate than that of the one surface, is an exemplary first surface of embodiments of the present invention.

In the thermal insulator 11 according to the present embodiment, a plurality of vacuum insulation members 2 can be combined in accordance with the shape of the thermal insulation target 1.

Where the thermal insulation target 1 for which the vacuum insulation members 2 are used has a high temperature, there is a risk that the surface of a shielding plate on the high temperature side may be oxidized by water and oxygen which enter the vacuum insulation members 2 through, for example, a sealing part of the package during long period use, which may lead to increase of the radiation rate and degradation of a radiation shielding function. However, since the radiation prevention film 5 is disposed on the low temperature side, temporal change of the thermal insulation performance of the radiation prevention film 5 is prevented or reduced even when the temperature inside of the thermal insulator 11 is higher than the temperature outside of the thermal insulator 11. Accordingly, the reliability can be maintained.

In the thermal insulator 11 according to the present embodiment, since the core 3 includes a single fiber sheet 6 having a stacked fiber structure or a stack of a plurality of the fiber sheets 6, the core 3 includes fibers having a high void space ratio. In addition, when the thermal conductivity of the whole vacuum insulation members is significantly small, the influence of radiation is relatively not negligible, and thus the radiation reduction effect can be obtained.

It is described above by way of example that the outer covering member 4 formed by joining the outer covering member sheets 4a and 4b into a bag is used. Instead, the two outer covering member sheets 4a and 4b may be sealed after depressurized. In this case, the two outer covering member sheets 4a and 4b may be disposed on both sides of the core 3 in the vacuum chamber, and the periphery of the two outer covering member sheets 4a and 4b may be sealed by heat sealing after depressurized in the vacuum chamber. Alternatively, the outer covering member 4 may be formed by bending a single outer covering member sheet and joining two sides thereof into a bag. Gas absorbent inserted into each vacuum insulation member 2 as necessary may be, for example, calcium oxide or zeolite, and is not particularly limited.

Embodiment 2

Figure 4:
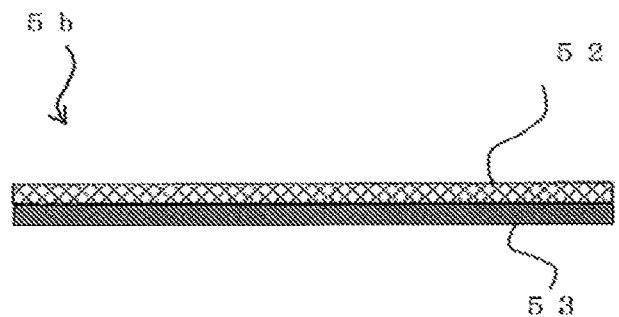
FIG. 4 is a pattern diagram of a radiation prevention film according to Embodiment 2.

In the present embodiment, a radiation prevention film having a lamination structure is used as a vacuum insulation member. In this regard, Embodiment is different from Embodiment 1. FIG. 4 is a pattern diagram of a radiation prevention film 5b according to the present embodiment. As illustrated in FIG. 4, the radiation prevention film 5b according to the present embodiment has a lamination structure including a metal foil film 52 and a polymer film 53. Any other configuration of the vacuum insulation members 2 is same as that of Embodiment 1, and thus description thereof will be omitted.

Configuration of Thermal Insulator 11

For example, the metal foil film 52 included in the radiation prevention film 5b is an aluminum foil film having a low radiation rate and a film thickness of 30 μm. The metal foil film 52 is, for example, an aluminum foil film having the gloss surface 50 and the non-gloss surface 51 formed by performing doubly-placed rolling at finishing rolling in a rolling process. For example, the polymer film 53 is an oriented polyethylene terephthalate film having a high radiation rate and a film thickness of 12 μm. The radiation prevention film 5b is obtained by stacking and integrating the metal foil film 52 and the polymer film 53 through, for example, lamination processing. The metal foil film 52 is disposed so that the gloss surface 50 is provided as the front surface of the radiation prevention film 5b.

The vacuum insulation member 2 is formed by inserting and sealing the above-described radiation prevention film 5b and the core 3 into the outer covering member 4 formed of the outer covering member sheets 4a and 4b. In this process, the radiation prevention film 5b is disposed so that the metal foil film 52 is located on the core 3 side and the polymer film 53 is located on the outer covering member sheet 4a side. Then, the thermal insulator 11 is formed by disposing the vacuum insulation member 2 on the circumference of the thermal insulation target 1 so that the outer covering member sheet 4b, the core 3, the metal foil film 52, the polymer film 53, and the outer covering member sheet 4a are located in this order from the thermal insulation target 1 side.

Performance Evaluation of Vacuum Insulation Member 2

Performance evaluation was performed on the vacuum insulation member 2 produced by using the radiation prevention film 5b. In the evaluation, thermal conductivity was measured with a low temperature side at a surface on which the radiation prevention film 5b was provided. As a result, the thermal conductivity was 0.0021 W/(m·K). The polyethylene terephthalate film provided on the low temperature side of the radiation prevention film 5b had a relatively high radiation rate of 0.5 approximately, but high performance was obtained. This is thought to be because the aluminum foil film having a low radiation rate was exposed on the high temperature side, and the polyethylene terephthalate film having a high radiation rate did not affect radiation heat transfer inside the vacuum insulation members 2. In addition, it is presumed that the aluminum foil film was reinforced by the polymer film 53 because of the laminate configuration, so that bending of the aluminum foil film and damage on the aluminum foil film that is easily caused at insertion into the outer covering member 4 were prevented, thereby maintaining the surface state of the metal.

Modifications

Figure 5:
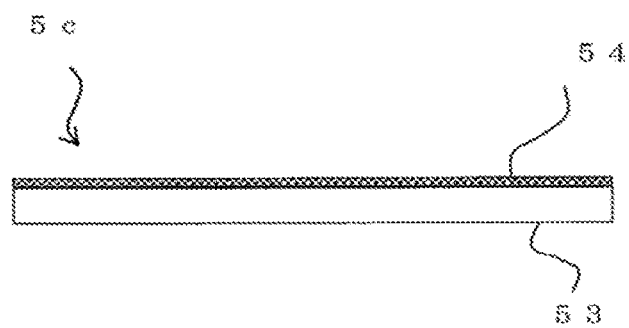
FIG. 5 is a pattern diagram of a radiation prevention film according to a modification of Embodiment 2.

FIG. 5 is a pattern diagram of a radiation prevention film 5c according to a modification of the present embodiment. As illustrated in FIG. 5, the radiation prevention film 5c of the modification 1 is an evaporation coated film in which a metal evaporation coated film 54 is formed on the polymer film 53. The polymer film 53 is a polyethylene terephthalate film having a thickness of, for example, 12 μm. The radiation rate of a surface on which the metal evaporation coated film 54 is formed is higher than that of the metal foil film 52 but lower than that of the polymer film 53, thereby obtaining advantages equivalent to those in the case in which the metal foil film 52 is used.

Effects

In the above-described thermal insulator 11 according to the present embodiment, one surface of the radiation prevention film 5 is the polymer film 53, and the other surface of the radiation prevention film 5 is the metal foil film 52. This configuration obtains, in addition to the advantages obtained in Embodiment 1, an advantage that the other surface is reinforced by the one surface and the surface state of the other surface can be prevented from degrading. In addition, when the radiation prevention film 5 is inserted into the outer covering member 4, the radiation prevention film 5 can be prevented from being damaged.

Although an aluminum foil film having gloss surfaces on both surfaces is fabricated from a single aluminum thin plate by rolling, two aluminum foil films simultaneously fabricated by rolling and each having the gloss surface 50 and the non-gloss surface 51 can be each applied as the radiation prevention film 5 in the thermal insulator 11 according to the present embodiment. Accordingly, the vacuum insulation member 2 achieving an equivalent radiation reduction effect can be obtained at a cost lower than that for the aluminum foil film having the gloss surfaces 50 on both surfaces.

Embodiment 3

Figure 6:
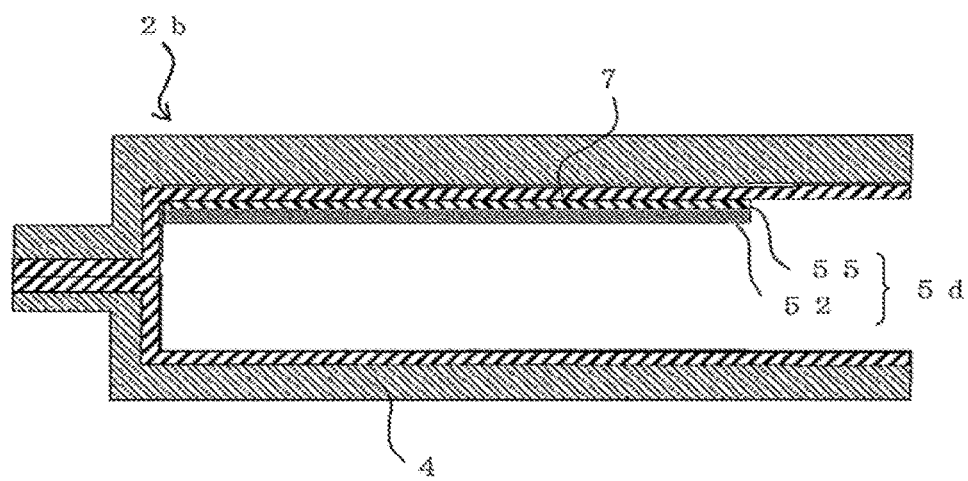
FIG. 6 is a pattern diagram of a vacuum insulation member according to Embodiment 3 halfway through manufacturing.

FIG. 6 is a pattern diagram illustrating the configuration of a vacuum insulation member 2b according to the present embodiment halfway through manufacturing. As illustrated in FIG. 6, the vacuum insulation member 2b includes a sealant layer 7 as the innermost layer of the outer covering member 4, and a radiation prevention film 5d including the metal foil film 52 and a thermal adhesion film 55. In this regard, Embodiment 3 is different from Embodiment 1. Any other configuration is same as that of Embodiment 1, and thus description thereof will be omitted. The sealant layer 7 corresponds to the cast polypropylene film as the innermost layer among the laminate films in the multi-layer structure in the above description. The thermal adhesion film 55 functions as a sealant film, and is a cast polypropylene film having a thickness of, for example 30 μm.

Method of Manufacturing Vacuum Insulation Member 2

In the process of manufacturing the vacuum insulation member 2b, the sealant layer 7 corresponding to the innermost layer of the outer covering member sheet 4a, and the thermal adhesion film 55 of the radiation prevention film 5d are fixed to each other through thermal adhesion in advance. For example, the outer covering member sheet 4a and the thermal adhesion film 55 may be partially thermally adhered to each other to form a bag.

With this configuration, occurrence of bending and breaking of the surface of the metal foil film 52 is prevented in the manufacturing process, thus facilitating the process of inserting the core 3 into the outer covering member 4. Accordingly, the vacuum insulation member 2b having a high performance, high quality, and high productivity can be obtained and applied to achieve the thermal insulator 11 having a high thermal insulation performance.

Effects

In the above-described thermal insulator 11 according to the present embodiment, since the polymer film 53 is a sealant film, the outer covering member 4 and the radiation prevention film 5 can be integrated with each other in advance. This configuration achieves, in addition to the advantages obtained in Embodiment 1, an advantage in which the surface of the metal foil film 52 is prevented from being bent and broken in the manufacturing process, thus facilitating the process of inserting the core 3 into the outer covering member 4.

In the thermal insulator 11 according to the present embodiment, the thermal adhesion temperature of the sealant film is equal to or lower than the thermal adhesion temperature of the outer covering member 4, and thus a reduced thermal load can be applied on the outer covering member 4 at the integration of the outer covering member 4 and the radiation prevention film 5.

In the present embodiment, the thermal adhesion film 55 is a cast polypropylene film, but is not limited thereto. The thermal adhesion film 55 may be made of linear low-density polyethylene, high-density polyethylene, ethylene vinyl alcohol copolymer, or cast polypropylene, for example. The above-described examples are also referred to as LLDPE, HDPE, cast EVOH, and cast PET, respectively.

In the above description, the material of the sealant layer 7 is the same as that of the thermal adhesion film 55, but they do not necessarily need to be same. However, it is preferable that the materials be the same because different materials have different thermal adhesion temperatures. It is also preferable that any thermal adhesion film having a thermal adhesion temperature lower than the thermal adhesion temperature of the sealant layer 7 be applied, because thermal influence on the sealant layer 7 can be reduced.

Embodiment 4

Figure 7:
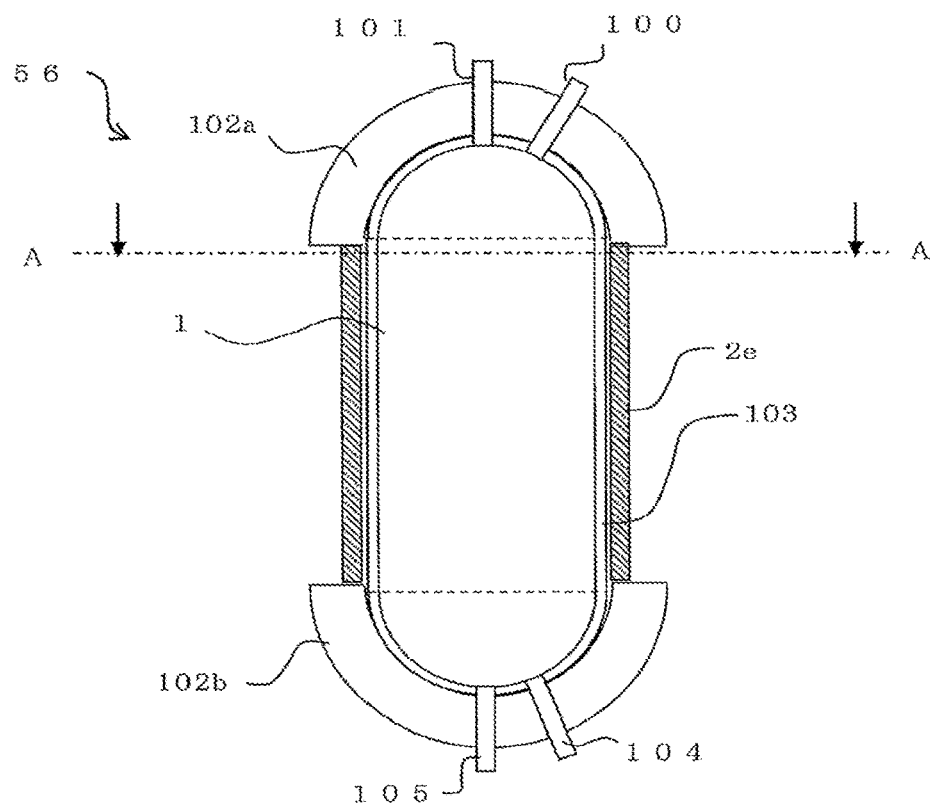
FIG. 7 is a pattern diagram illustrating a longitudinal section of a hot-water tank according to Embodiment 4.

The present embodiment will describe below a case in which the thermal insulators described with respect to Embodiments 1 to 3 are applied to a hot-water tank 56 as an exemplary thermal insulator 11. FIG. 7 is a pattern diagram illustrating a longitudinal section of the hot-water tank 56 according to the present embodiment. As illustrated in FIG. 7, the hot-water tank 56 includes a tank 103 in which heated water is accumulated. The tank 103 in which heated water is accumulated corresponds to the thermal insulator 11.

Configuration of Hot-Water Tank 56

The tank 103 has, for example, a substantially cylindrical shape. An upper pipe 100 and a hot-water supply pipe 101 are connected with an upper part of the tank 103. A bottom pipe 105 and a water supply pipe 104 are connected with a lower part of the tank 103. The upper pipe 100 and the bottom pipe 105 are connected with a heating device (not illustrated) such as a heat pump unit.

Water accumulated in the tank 103 is transferred to the heating device (not illustrated) through the bottom pipe 105, heated at the heating device, and returned to the upper part inside the tank 103 through the upper pipe 100. When water is supplied to the tank 103, heated water accumulated in the tank 103, that is, hot water, is pushed up. Through this operation, the hot water is externally supplied through the hot-water supply pipe 101 connected with the upper part of the tank 103. Temperature stratification layers separated in high-temperature and low-temperature portions are formed in the tank 103 because of the temperature difference between the hot water and the water. For example, where a $CO_2$ heat pump is used as a heat pump of the heating device, heat is transferred between a $CO_2$ cycle system and a water cycle system through a heat exchanger. The temperature of water accumulated in the tank 103 is approximately 90 degrees C. by high-temperature boiling and approximately 65 degrees C. by low-temperature boiling, and the temperature at the surface of the thermal insulator 11 is substantially equal to these temperatures.

The tank 103 has upper and bottom surfaces covered by a first foamed thermal insulation member 102a and a second foamed thermal insulation member 102b, respectively, and has a body part which is covered by a vacuum insulation member 2e so that it is thermally insulated between the tank 103 and surrounding air. The first foamed thermal insulation member 102a and the second foamed thermal insulation member 102b are made of foamed resin such as polystyrene foamed by a bead method.

Figure 8:
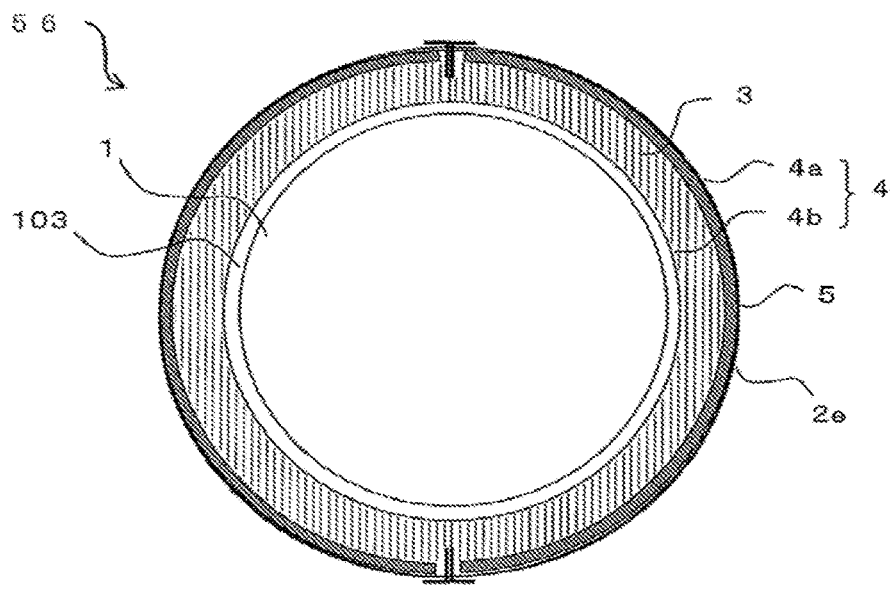
FIG. 8 is a pattern diagram illustrating the hot-water tank according to Embodiment 4.

FIG. 8 is a pattern diagram illustrating the hot-water tank 56 according to the present embodiment, and also illustrates a section taken along line A-A in FIG. 7. As illustrated in FIG. 8, the periphery of the tank 103 is covered by the vacuum insulation member 2e in the hot-water tank 56. Similarly to Embodiment 1, the vacuum insulation member 2e has a lamination structure including the outer covering member 4, the core 3 provided in the two outer covering member sheets 4a and 4b included in the outer covering member 4, and the radiation prevention film 5 disposed between the core 3 and the outer covering member sheet 4a. The vacuum insulation member 2e is formed in the shape of an arc covering the circumference of the hot-water tank 56 by, for example, a triaxial roller. When viewed in a plane along the radial direction of the arc, the vacuum insulation member 2e is formed in the shape of such an arc that the outer covering member sheet 4a is located outside whereas the outer covering member sheet 4b is located inside, and the radiation prevention film 5 is disposed on the outer side of the core of the vacuum insulation member 2e which is cylindrically formed.

Since the vacuum insulation member 2e is bent and formed in the shape of a curved surface such as an arc shape, an in-plane stress acts because of the difference between inner and outer peripheries in bending which occurs in relation to the thickness of the vacuum insulation member 2e, and accordingly, a deep wrinkle is made to appear on the outer covering member sheet 4b on the inner periphery side of the vacuum insulation member 2e. On the other hand, the radiation prevention film 5 and the outer covering member sheet 4a on the outer periphery side are pulled, and thus a wrinkle hardly appears.

For example, where the radiation prevention film 5 is provided between the core 3 and each of the outer covering member sheets 4a and 4b on both surfaces thereof in place of the configuration of the vacuum insulation member 2e, wrinkles appear on both of the outer covering member sheet 4b and the radiation prevention film 5 on the inner periphery side. The wrinkle of the radiation prevention film 5 is located close to the radiation prevention film 5 on the outer periphery side and works as a heat transfer medium. It leads to degradation of the thermal insulation performance of the thermal insulator 11. However, with the configuration of the vacuum insulation member 2e, no wrinkle appears on the radiation prevention film 5 on the inner periphery side. That is, it is possible to prevent a wrinkle from appearing on a position close to the radiation prevention film 5 on the outer periphery side, and thus prevents it from working as a heat transfer medium.

Performance Evaluation of Vacuum Insulation Member 2e

Thermal conductivity in the case where the vacuum insulation member 2e according to the present embodiment is applied to the tank 103 was measured, and performance evaluation was performed in comparison with a vacuum insulation member according to Comparative Example 3. In each of the vacuum insulation member 2e of the present embodiment and the vacuum insulation member of Comparative Example 3, the fiber sheets 6 produced by cutting in a planar dimension of 900 mm×600 mm were included in the core 3. The radiation prevention film 5 was an aluminum foil film having a thickness of 30 µm.

The vacuum insulation member 2e of the present embodiment, in which the radiation prevention film 5 is interposed only between the outer covering member sheet 4a and the core 3 such that the gloss surface 50 is located on the core 3 side, was formed by sealing. The vacuum insulation member of Comparative Example 3, in which the radiation prevention film 5 is interposed between the core 3 and each of the two outer covering member sheets 4a and 4b such that the gloss surface 50 is located on the core 3 side, was formed by decompression sealing. Any other configuration was same as that described with respect to Embodiment 1.

The vacuum insulation member 2e of the present embodiment was formed in a flat plate shape, and then curved into a cylindrical shape having a circumferential direction along a longer side thereof and a curvature radius of 200 mm while the outer covering member sheet 4a was disposed as an outer surface, and formed into the shape of the tank 103. Similarly, the vacuum insulation member of Comparative Example 3 was curved into a cylindrical shape having a circumferential direction along a longer side thereof and a curvature radius of 200 mm, and formed in the shape of the tank 103.

Subsequently, thermal conductivity was measured with respect to each of the vacuum insulation member 2e of the present embodiment and the vacuum insulation member of Comparative Example 3. Where the vacuum insulation member 2e of the present embodiment and the vacuum insulation member of Comparative Example 3 each had a flat plate shape, the thermal conductivity was 0.0023 W/(m·K) for both vacuum insulation members. However, where the vacuum insulation member 2e of the present embodiment and the vacuum insulation member of Comparative Example 3 each had a cylindrical shape, the thermal conductivity was 0.0025 W/(m·K) with respect to the vacuum insulation member 2e of the present embodiment, and 0.0027 W/(m·K) with respect to the vacuum insulation member of Comparative Example 3. From this result, it is confirmed that in the case with the flat plate shape, the vacuum insulation member 2e of the present embodiment, in which the radiation prevention film 5 is provided only on the outer peripheral surface, also fulfills a radiation heat shielding function equivalent to that of the configuration in which the radiation prevention films 5 are provided on both of the outer and inner peripheral surfaces. It is also confirmed that in the case with the cylindrical shape, degradation of the thermal conductivity can be reduced by the configuration of the vacuum insulation member 2e has the configuration, in which the core 3 and the radiation prevention film 5 are disposed in this order from the tank 103 side.

Subsequently, observation was made on an inner surface on the inner periphery side in the case where the vacuum insulation member 2e of the present embodiment and the vacuum insulation member of Comparative Example 3 each had a cylindrical shape. In the vacuum insulation member 2e of the present embodiment, a large wrinkle having a width and a depth of 1 to 2 mm approximately appeared on the outer covering member sheet 4b on the inner periphery side, whereas a wrinkle hardly appeared on the outer covering member sheet 4a and the radiation prevention film 5 on the outer periphery side. In the vacuum insulation member of Comparative Example 3, a large wrinkle having a width and a depth of 1 to 2 mm approximately appeared on the outer covering member sheet 4b on the inner periphery side, and the radiation prevention film 5 between the outer covering member sheet 4b and the core 3 was curved along the gathering of the outer covering member sheet 4b. From this result of the observation, it is presumed that the thermal conductivity of the vacuum insulation member of Comparative Example 3, which had a cylindrical shape, was increased because the radiation prevention film 5 on the curved inner peripheral surface was inclined in the radial direction of the tank 103 as the direction of heat transfer. However, the thermal conductivity of the vacuum insulation member 2e of the present embodiment could be kept low because no wrinkle appeared on the radiation prevention film 5 on the outer peripheral surface and no radiation prevention film 5 inclined in the direction of heat transfer was present.

Effects

The above-described thermal insulator 11 according to the present embodiment includes a curved surface, and the vacuum insulation member 2e formed in an arc shape in accordance with the shape of the thermal insulator 11. Since the vacuum insulation member 2e has the configuration in which the core 3 and the radiation prevention film 5 are disposed in this order from the tank 103 side, a wrinkle, which was observed in Comparative Example 3, does not appear on the radiation prevention film 5 on the inner periphery side. That is, it is possible to prevent a wrinkle from being located close to the radiation prevention film 5 on the outer periphery side. In other words, it is possible to prevent a wrinkle working as a heat transfer medium from appearing. Accordingly, an excellent thermal insulation performance of the hot-water tank 56 is maintained.

The vacuum insulation member 2e is provided on a side surface of the tank 103 in the example described with respect to Embodiment 4, but may be provided at the upper or lower part of the tank 103. The upper and bottom surfaces of the tank 103 are covered by the first foamed thermal insulation member 102a and the second foamed thermal insulation member 102b in the above-described example, but may be covered by the vacuum insulation member 2e. The vacuum insulation member 2e is also applicable to a cooling/heating energy instrument such as a compressor having a substantially cylindrical shape as a thermal insulator in addition to the hot-water tank 56.

Embodiment 5

Figure 9:
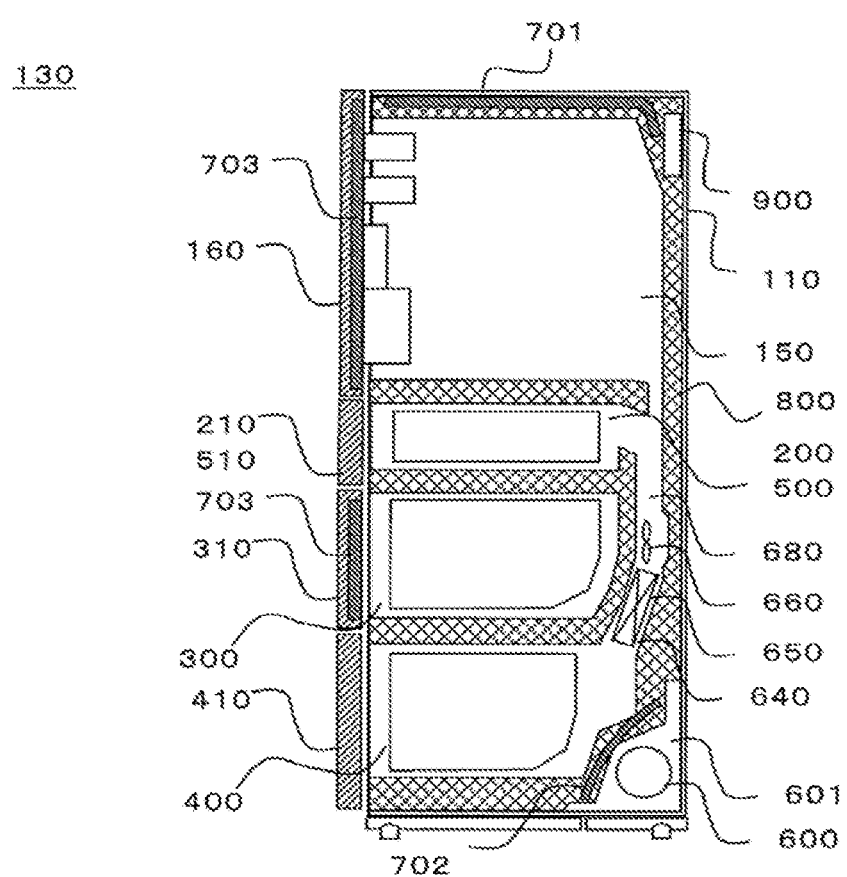
FIG. 9 is a pattern diagram illustrating a section of a side surface of a refrigerator according to Embodiment 5.
Figure 10:
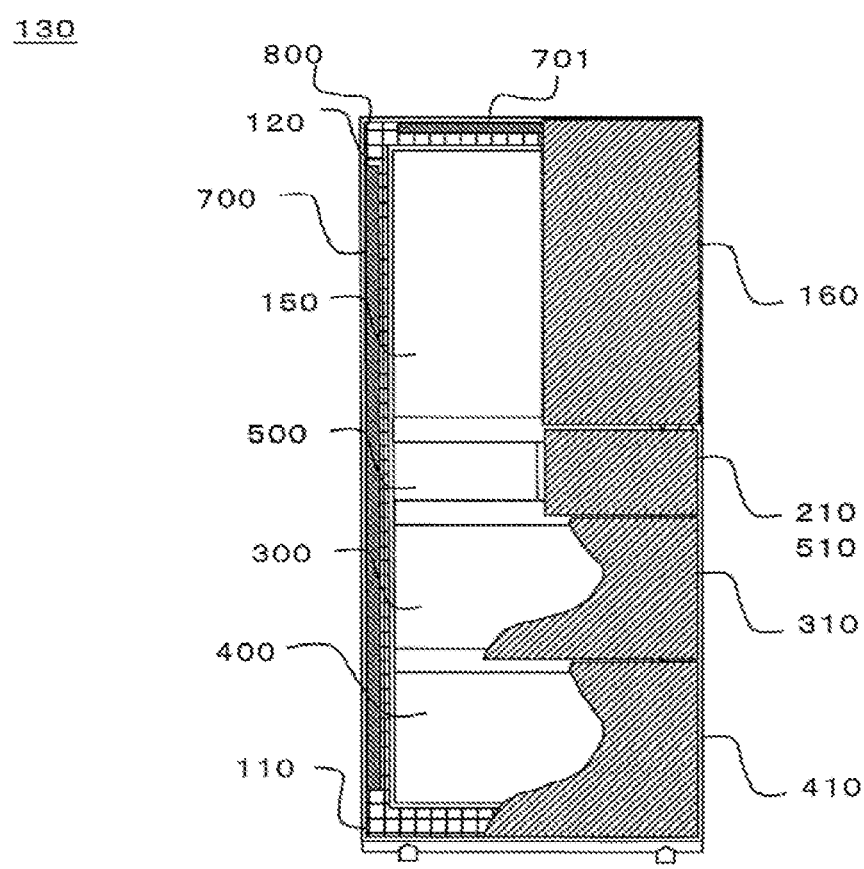
FIG. 10 is a pattern diagram illustrating a partial section of a front surface of the refrigerator according to Embodiment 5.

Embodiment 5 will be described by referring to the case in which a refrigerator 130 is applied as an example of the thermal insulator 11 described with respect to Embodiments 1 to 3. FIG. 9 is a pattern diagram illustrating a section of a side surface of the refrigerator according to the present embodiment. FIG. 10 is a pattern diagram illustrating a partial section of a front surface of the refrigerator according to the present embodiment. As illustrated in FIGS. 9 and 10, the inside of the refrigerator 130 is partitioned into a refrigerating compartment 150, a switching compartment 200, a freezing compartment 300, a vegetable compartment 400, and an ice compartment 500. The compartments are provided with a refrigerating compartment door 160, a switching compartment door 210, a freezing compartment door 310, and a vegetable compartment door 410 as opening and closing doors. A machine compartment 601 is provided inside the refrigerator 130, and a compressor 600 is installed inside the machine compartment 601. A cooler compartment 640 is provided above the machine compartment 601. In the cooler compartment 640, a cooler 650 and a fan 660 are installed and a cooling wind path 680 is provided. The vacuum insulation members 2 such as a side surface vacuum insulation member 700, a ceiling vacuum insulation member 701, and a machine compartment vacuum insulation member 702 are disposed in a region of the refrigerator 130 which is sandwiched between an outer box 110 and an inner box 120, whereas the other region is filled with a foamed thermal insulation member 800. Door vacuum insulation members 703 are installed in the freezing compartment door 310 and the refrigerating compartment door 160. A control substrate housing compartment 900 is provided at a back surface of the refrigerator 130. In this example, the inner box 120 corresponds to the thermal insulator 11.

In FIGS. 9 and 10, the food storage compartments of the refrigerator 130 are controlled with an operation panel (not illustrated) for adjusting the temperature and settings of each compartment. For example, with respect to the food storage compartments of the refrigerator 130, the operation panel (not illustrated), is used to control adjustment of the temperature and settings of the refrigerating compartment 150 (4 degrees C. approximately) including the refrigerating compartment door 160 as an opening and closing door and disposed at a top part among the food storage compartments of the refrigerator 130. The operation panel (not illustrated) is also used to control adjustment of the temperature and settings of the switching compartment 200 provided with, below the refrigerating compartment 150, the drawer-type switching compartment door 210 that is switchable between a freezing temperature range (−18 degrees C.) and temperature ranges of refrigeration, vegetable, chilled, soft freezing (−7 degrees C.), and other temperature ranges. The operation panel (not illustrated) is also used to control adjustment of the temperatures and settings of the ice compartment 500 (−12 degrees C. approximately) provided with a drawer-type ice compartment door 510 in parallel to the switching compartment 200, and the vegetable compartment 400 (12 degrees C. approximately) provided with the drawer-type vegetable compartment door 410 and disposed at a bottom part. The operation panel (not illustrated) is also used to control adjustment of the temperature and settings of the freezing compartment 300 (−18 degrees C. approximately) provided with the drawer-type freezing compartment door 310 and disposed between the vegetable compartment 400 and each of the switching compartment 200 and the ice compartment 500.

Specifically, a controller of the control substrate housing compartment 900 provided at an upper part of the back surface of the refrigerator maintains each compartment at a predetermined temperature by controlling, for example, the compressor 600 provided in the machine compartment 601 at a lower part of the back surface, the fan 660 configured to send cool air from the cooler 650 provided in the cooler compartment 640, and a damper provided at the entrance of the compartment, which are included in a refrigeration cycle (not illustrated) and the like.

In order that the cooled compartments be kept at predetermined temperatures, they as well as their doors are surrounded by vacuum insulation members 2f such as the side surface vacuum insulation member 700, the ceiling vacuum insulation member 701, the machine compartment vacuum insulation member 702, and the door vacuum insulation members 703, and the foamed thermal insulation member 800, thereby preventing heat from entering them from the outside. As viewed in a section of each vacuum insulation member 2f, the radiation prevention film 5 is disposed on the outer box 110 side. It should be noted that for example, in order to thermally shield the control housing compartment from the other compartments, the ceiling vacuum insulation member 701 is formed in a bent shape along the shapes thereof. In the present embodiment, the thermal insulator 11 corresponds to the inner box 120, and the vacuum insulation members 2f are same as those described with respect to Embodiments 1 to 4 in that the vacuum insulation members are obtained by performing vacuum sealing of the core 3 and the radiation prevention film 5 inserted in the outer covering member 4. However, the radiation prevention film 5 is disposed on the outer box 110 side at which the temperature is close to the temperature of the outer region. In this regard, Embodiment 5 is different from Embodiments 1 to 4. That is, in Embodiment 5, the temperature on the other surface side is closer to the temperature of the outer region than that on the one surface side. The radiation prevention film 5 is disposed so that a high radiation rate side, for example, the non-gloss surface 51 is located on the outer box 110 side.

The machine compartment vacuum insulation member 702 serves as shielding against generated heat from the compressor 600. In this case, the inner box 120 is thermally insulated in a functional aspect of the refrigerator 130, but generated heat from the compressor 600 is thermally insulated in an aspect of individual instruments. Thus, the thermal insulation target 1 is the compressor 600, and the vacuum insulation member is formed in a bent shape along the shape of the machine compartment 601.

The machine compartment vacuum insulation member 702 is same as those described with respect to Embodiments 1 to 4 in that the vacuum insulation member is obtained by performing vacuum sealing of the core 3 and the radiation prevention film 5 inserted in the outer covering member 4. However, the radiation prevention film 5 is disposed on the inner box 120 side. In this regard, Embodiment 5 is different from Embodiments 1 to 4

Each vacuum insulation member is bent to be formed in the shape of a curved surface such as an arc shape having a small curvature radius, and thus, an in-plane stress acts because of the difference between inner and outer peripheries in bending which occurs in relation to the thickness of the vacuum insulation member, and accordingly, a deep wrinkle appears on the outer covering member sheet on the inner periphery side of the vacuum insulation member. The radiation prevention film 5 and the outer covering member sheet on the outer periphery side are pulled, and thus a wrinkle hardly appears. Accordingly, where the construction of the present embodiment is not applied, for example, where the radiation prevention film 5 is provided between the core 3 and each of the outer covering member sheets 4a and 4b on both surfaces thereof in place of the configuration of the present invention, a wrinkle appears on both of the outer covering member sheet and the radiation prevention film 5 on the inner periphery side. The wrinkle of the radiation prevention film 5 is located close to the radiation prevention film 5 on the outer periphery side, and works as a heat transfer medium, which leads to degradation of the thermal insulation performance of the thermal insulator 11. On the other hand, with the configuration of the vacuum insulation member 2f of the embodiment, no wrinkle appears on the radiation prevention film 5 on the inner periphery side. That is, a wrinkle located close to the radiation prevention film 5 on the outer periphery side does not appear. In other words, a wrinkle working as a heat transfer medium does not appear.

REFERENCE SIGNS LIST 1 thermal insulation target 2, 2b, 2e vacuum insulation member 3 core
4 outer covering member 4a, 4b outer covering member sheet 5, 5b, 5c, 5d radiation prevention film 6 fiber sheet 7 sealant layer 11 thermal insulator 50 gloss surface 51 non-gloss surface 52 metal foil film 53 polymer film 54 metal evaporation coated film 55 thermal adhesion film 56 hot-water tank 100 upper pipe 101 hot-water supply pipe 102a first foamed thermal insulation member 102b second foamed thermal insulation member 103 tank 104 water supply pipe 105 bottom pipe 110 outer box
120 inner box 130 refrigerator 150 refrigerating compartment 160 refrigerating compartment door 200 switching compartment 210 switching compartment door 300 freezing compartment 310 freezing compartment door
400 vegetable compartment 410 vegetable compartment door 500 ice compartment 510 ice compartment door 600 compressor 601 machine compartment 640 cooler compartment 650 cooler 660 fan 680 cooling wind path 700 side surface vacuum insulation member 701 ceiling vacuum insulation member 702 machine compartment vacuum insulation member
703 door vacuum insulation member 800 foamed thermal insulation member
900 control substrate housing compartment

The invention claimed is:

1. A vacuum insulation member configured to thermally insulate a thermal insulation target disposed on one surface side from an outer region located on another surface side, the vacuum insulation member comprising:
a core;
an outer covering member enclosing the core; and
a radiation prevention film configured to prevent or reduce radiation,
wherein the radiation prevention film is disposed between the core and the outer covering member and in a peripheral region on the other surface side of the one surface side and the other surface side to prevent or reduce radiation, and having a first surface and a second surface provided as a back surface of the first surface, the first surface having a higher radiation rate than that of the second surface.

2. A thermal insulator comprising the vacuum insulation member of claim 1 and a thermal insulation target disposed on one surface side of the vacuum insulation member, and configured to thermally insulate the thermal insulation target from an outer region located on another surface side of the vacuum insulation member.

3. The thermal insulator of claim 2, wherein a temperature on the other surface side is closer to a temperature of the outer region than a temperature on the one surface side.

4. The thermal insulator of claim 2, wherein the radiation prevention film includes:
a polymer film located on the first surface; and
a metal foil film located on the second surface.

5. The thermal insulator of claim 4, wherein the polymer film is a sealant film.

6. The thermal insulator of claim 5, wherein the sealant film has a thermal adhesion temperature equal to or lower than a thermal adhesion temperature of the outer covering member.

7. The thermal insulator of claim 2, wherein:
the radiation prevention film includes an aluminum foil film having a gloss surface and a non-gloss surface,
the first surface is the non-gloss surface, and
the second surface is the gloss surface.

8. The thermal insulator of claim 2, wherein the radiation prevention film is in contact with the core at the second surface.

9. The thermal insulator of claim 2, wherein:
the thermal insulation target includes a portion formed in a shape of a curved surface, and
the vacuum insulation member is shaped in an arc in accordance with the surface of the curved surface.

10. The thermal insulator of claim 2, wherein the thermal insulation target is a refrigerator.

11. A method of manufacturing a vacuum insulation member configured to thermally insulate a thermal insulation target disposed on one surface side from an outer region located on another surface side, the method comprising:
a preparation process of preparing a core, an outer covering member enclosing the core, and a radiation prevention film having a first surface and a second surface provided as a back surface of the first surface and configured to prevent or reduce radiation, the first surface having a higher radiation rate than that of the second surface;
a disposition process of inserting the core and the radiation prevention film into the outer covering member and disposing the radiation prevention film between the core and the outer covering member and in a peripheral region on the other surface side of the one surface side and the other surface side; and
a vacuum sealing process of performing vacuum sealing of the outer covering member in which the core is inserted and the radiation prevention film is disposed in the peripheral region.

* * * * *